3,062,673
MANUFACTURE OF TITANIUM DIOXIDE
Raymond James Wigginton, Luton, England, assignor to Laporte Titanium Limited, Luton, England, a company of Great Britain
No Drawing. Filed Sept. 14, 1959, Ser. No. 839,601
Claims priority, application Great Britain Sept. 17, 1958
8 Claims. (Cl. 106—300)

This invention relates to the manufacture of titanium dioxide in a form that is especially suitable for incorporation as an opacifier in vitreous enamels. Apart from freedom from impurities imparting discoloration and poor reflectance to the enamel in which the titanium dioxide is incorporated, titanium dioxide suitable for the above purpose should have free flowing properties in the dry state, be capable of mixing easily in the dry state with the ingredients of the enamel frit, and dissolve well in the frit during smelting.

Titanium dioxide such as is suitable as a pigment is usually made by the hydrolysis of an aqueous solution of a titanium salt, generally titanium sulphate or sometimes titanium tetrachloride, having a concentration of titanium salt greater than 150 grams per litre, calculated as $TiO_2$ followed by calcination of the resulting precipitate of hydrous titanium dioxide. The precipitate resulting from the hydrolysis is composed of fine particles which undergo agglomeration and sintering during calcination. The aggregates resulting from the calcination are broken down by grinding into particles of a size not exceeding 1 micron and often not exceeding 0.6 micron, and usually into particles of about 0.2 to 0.4 micron. The calcined and ground particles are suitable for pigment purposes, and are approximately the same size as the particles of the hydrous precipitate, the calcined and ground particles being only slightly smaller due to the calcination. This material is unsuitable for incorporation in vitreous enamels, since it "balls-up" when mixed in the dry state with the ingredients of enamel frits and this leads to incomplete solution of the titanium dioxide during smelting. It is possible to separate from the calcined titanium dioxide, before grinding, a fraction of relatively coarse material known as granular quality, which can be used for incorporation in vitreous enamels, but this material also does not dissolve well during smelting.

It is also possible to obtain by the hydrolysis of an aqueous solution of a titanium salt a precipitate of hydrous titanium dioxide of coarser particle size such that, after calcination and dressing, it consists wholly or mainly of particles within the range of 5 to 20 microns.

The particles of the hydrous precipitate are approximately the same size as the calcined and dressed particles, the latter being only slightly smaller due to the calcination. The term "dressing" is known in the art, and denotes such methods of disintegration, less severe than grinding, as are brought about by disintegration in a swing hammer mill or pin mill or by sieving.

However, when such a precipitate of coarser particle size is calcined, insufficient agglomeration occurs and the greater part of the coarse aggregates disintegrate during the calcination, and the drying which precedes it, to form a fine powdery material which readily forms a dust. This dusty character of the material is highly objectionable and renders the material difficult to handle, for example, in rotary coolers. Furthermore, when the hydrous precipitate is calcined in a rotary calciner in which the precipitate moves in countercurrent to the stream of hot combustion gases, dusty material resulting from drying is entrained with the gases and carried out of the calciner.

The present invention provides a process for the manufacture of titanium dioxide suitable for incorporation in vitreous enamels, wherein a hydrous precipitated titanium dioxide of coarse particle size such that, before and after calcination and dressing, it consists wholly or mainly of particles within the range of approximately 5 to 20 microns is mixed with a hydrous precipitated titanium dioxide of fine particle size such that, before and after calcination and grinding, it consists of particles of a size not exceeding 3 microns, or, if desired, not exceeding 1 micron, the proportion of the latter titanium dioxide amounting to 2.5 to 50 percent of the mixture calculated as $TiO_2$, and the mixture is subjected to calcination.

The calcination conditions are those customarily used for calcining hydrous titanium dioxide precipitates, the calcination temperature being within the range of 600° C. to 1100° C., and advantageously 700° C. to 900° C., and it will be understood that the calcination conditions should be such as to yield a product containing at least 97% $TiO_2$ and preferably 98.5% $TiO_2$.

The titanium salts, from which the titanium dioxide precipitates of coarse and fine particle size are derived, may be titanium sulphate or titanium tetrachloride. The precipitates are advantageously prepared by the hydrolysis of aqueous solutions of titanium sulphate obtained by the sulphation of ilmenite or a titanium-enriched material prepared from ilmenite, for example, Sorel slag.

A preferred method for preparing the aforesaid hydrous titanium dioxide of coarse particle size is to hydrolyse an aqueous solution of titanium sulphate under conditions such that substantially the whole or the greater part of the hydrolysis takes place at a concentration of titanium (dissolved and undissolved) within the range of 40 to 125 grams per litre calculated as $TiO_2$ and at a factor of acidity not exceeding 100 percent. The temperature at which the hydrolysis is carried out should be at least 80° C., although the hydrolysis is slow at that minimum temperature. A temperature ranging from 90° C. up to the boiling point of the solution is therefore preferred. The factor of acidity is advantageously within the range of 40 to 70 percent. Conditions that tend to favour the formation of a product of fine particle size should, of course, be avoided as far as possible. Thus, for example, the presence of large amounts of nuclei of hydrous titanium dioxide, such as are advantageous in the hydrolysis of titanium salt solution to produce precipitates yielding titanium dioxide pigments are undesirable, and the proportion of such nuclei, if present, should not exceed 2 percent of the total titanium used, calculated as $TiO_2$.

An advantageous procedure, which favours the production of large particles is to add a titanium sulphate solution having a concentration of titanium higher than 125 grams per litre, calculated as $TiO_2$ slowly to a proportion of hot water such that after complete mixing the concentration of titanium (dissolved and undissolved) is within the aforesaid range of 40 to 125 grams per litre, and, after the addition of the titanium salt solution, to complete the hydrolysis, for example, by boiling the mixture. The rate of the addition is preferably such that it is complete within a period of 5 to 40 minutes.

The aforesaid hydrous titanium dioxide of fine particle size may be prepared by any method known for hydrolysing a titanium salt solution to produce a precipitate suitable for pigment manufacture. The hydrolysis is carried out at a concentration of titanium (dissolved and undissolved) higher than 150 grams per litre, and advantageously 180 to 230 grams per litre, calculated at $TiO_2$ and advantageously in the presence of nuclei of hydrous titanium dioxide. Alternatively the precipitate of fine particle size may be prepared in known manner by precipitation with alkali from a titanium salt solution.

Before the calcination the precipitates are washed in the usual manner, and they may be washed before or after being mixed together. After being washed, and before calcination, the precipitates may be treated with an alkali, for example, ammonia or sodium carbonate, to neutralise the residual acid present therein, and then washed to remove the salt formed by the neutralisation.

If desired, there may be incorporated with the mixture of the precipitates, prior to calcination, a small proportion of a conditioning agent for neutralising the residual acidity of the product, for example, potassium carbonate, sodium carbonate or phosphate or borax.

After the calcination, the macro-aggregates of which the calcined mixture is composed are broken up by dressing, for example, by means of a swing hammer mill, pin mill or other means, such as sieving, to an extent such that all the material passes through a 60 mesh B.S.S. sieve, and preferably the whole or the greater part thereof passes through a 100 mesh B.S.S. sieve. The product so obtained is relatively free flowing, non-dusting, mixes readily with the ingredients of enamel frits, and dissolves well during smelting.

The following examples illustrate the invention:

EXAMPLE 1

(a) 1000 gallons of a titanium sulphate solution obtained by the sulphation of ilmenite, and containing, per litre, 180 grams of $TiO_2$, 60 grams of Fe, 6.6 grams of $MnSO_4$ and 460 grams of $H_2SO_4$ (factor of acidity of 58.5 percent), were heated to 65° C., and then run at a uniform rate in the course of 30 minutes into 1250 gallons of water having a temperature of 90° C. Throughout the addition the mixture was maintained at 90° C. The final concentration of titanium was, therefore, 80 grams per litre, calculated as $TiO_2$, when the addition was complete, the whole was raised to the boil and maintained at the boil for 2 hours. The yield was 90 percent. The precipitate so obtained was of a coarse particle size such that, after calcination and dressing, it consisted mainly of particles of 10 to 20 microns.

(b) To 200 gallons of a titanium sulphate solution obtained by the sulphation of ilmenite, and containing, per litre, 210 grams of $TiO_2$, 70 grams of Fe, 7.7 grams of $MnSO_4$ and 537 grams of $H_2SO_4$ (factor of acidity 59 percent), were added a nucleating liquor prepared by mixing at 65° C. with a portion of the said titanium sulphate solution, diluted to 30 grams per litre of $TiO_2$ a quantity of a caustic soda solution containing 100 grams of NaOH per litre such that the mixture had a pH-value of 3.5. The quantity of nucleating liquor added was such as to introduce 0.25 percent of titanium based on the titanium content of the titanium sulphate solution calculated as $TiO_2$. The nucleated liquor was raised to the boil in the course of 1 hour, and boiled at constant volume for a further 3 hours. It was then diluted with water in the course of 30 minutes to a titanium concentration of 180 grams of $TiO_2$ per litre, and the whole was boiled for a further 30 minutes. A yield of 97 percent was obtained. The precipitate so obtained was of a fine particle size such that, after calcination and grinding, it had a particle size of 0.2 to 0.25 micron.

Suspensions of hydrolysates obtained as described under (a) and (b) above were mixed together in proportions such that 20 percent of the titanium dioxide present in the mixture consisted of the titanium dioxide of suspension (b). The mixed precipitates were washed free from iron in the usual manner by dilution with water followed by settling and washing on rotary vacuum filters.

The washed mixed pulp from several batches prepared as described above was heated in a rotary calciner. The total period of passage through the calciner was 12 hours, during 1–2 hours of which the material was at 800° C. The resulting titanium dioxide contained about 5% of rutile, and there was negligible loss due to dusting from the calciner, cooler and during subsequent handling. The calcined product was then passed through a swing hammer mill, and there was obtained a free flowing product which had a bulk density of 1.5, and of which the whole passed through a 100 mesh B.S.S. sieve and consisted mainly of particles in the range of 10–20 microns. It was especially suitable for incorporation in vitreous enamels.

When the precipitate obtained as described under (a) above was calcined alone under the same conditions approximately 25% of the material was lost as dust from the calciner, cooler and handling equipment.

EXAMPLE 2

(a) 1000 gallons of a titanium sulphate solution obtained by the sulphation of ilmenite, and containing, per litre, 162.9 grams of $TiO_2$, 4.1 grams of $TiO_2$ (as titanous). 61.6 grams of Fe, 6.0 grams of $MnSO_4$ and 436 grams of $H_2SO_4$ (factor of acidity 61.7 percent) were heated to 66° C., and then run at a uniform rate in the course of 22 minutes into 975 gallons of water at 90° C. The final concentration was 82.5 grams of $TiO_2$ per litre. The whole was raised to the boil and boiled for 2 hours. The yield was 95.4 percent, and the precipitate so obtained settled rapidly. A 250 ml. test portion of the hot hydrolysate, when allowed to settle for 1 hour gave a settled precipitate having a volume of 24 mls. This coarse particle precipitate, after being washed, calcined at 900° C. and dressed, consisted mainly of particles ranging from 10 to 20 microns.

(b) To 1800 gallons of a titanium sulphate solution identical with that described under (a) above was added a nucleating liquor prepared by mixing at 65° C. a portion of the same titanium sulphate solution diluted to a $TiO_2$ content of 30 grams per litre with such a quantity of a caustic soda solution containing 100 grams of NaOH per litre that the mixture had a pH-value of 3.5. The quantity of the nucleating liquor added to the titanium sulphate solution was such as to introduce a quantity of titanium, calculated as $TiO_2$, amounting to 0.70 percent of the titanium content of the titanium sulphate solution. The nucleated liquor was raised to the boil in the course of 1 hour and boiled for a further 2 hours. The yield was 94 percent. The precipitate so obtained was of a fine particle size such that, after being washed, calcined and ground, it had a particle size of 0.35 to 0.45 micron.

Suspensions of hydrolysates obtained as described under (a) and (b) were washed separately to remove iron and excess sulphuric acid, and were than mixed together in relative proportions such that 15% of the titanium dioxide present in the mixture consisted of titanium dioxide from suspension (b). The mixed pulp was calcined in a rotary calciner, the total period of passage being 6 hours during 1½ hours of which the material was at 850° C. The resulting titanium dioxide was substantially anatase and there was a negligible loss due to dusting from the calciner and the cooler and during subsequent handling. The calcined product was obtained as a free flowing product having a bulk density of 1.44, and of which the whole passed through a 100 mesh B.S.S. sieve and consisted mainly of particles ranging from 10 to 20 microns. It was a free flowing titanium dioxide containing 98.8 percent of $TiO_2$, and was suitable for incorporation in vitreous enamels. By using an arbitrary test, described below, for determining the content of dust of the product a dust content of 11 percent was found. The dust content of the titanium dioxide of coarse particle size, after calcination alone, was determined by the same test and found to be 81 percent.

EXAMPLE 3

(a) The coarse particle precipitate was prepared as described in Example 2.

(b) The fine particle precipitate was prepared from a titanium sulphate solution containing, per litre, 157.9 grams of $TiO_2$, 4.9 grams of $TiO_2$ (as titanous), 62.8 grams of Fe, 5.5 grams of $MnSO_4$, 431.5 grams of $H_2SO_4$ (factor of acidity of 64.9 percent). 154 gallons of this solution at 70° C. were run in the course of 2 minutes 10 seconds into 561 gallons of water maintained at 90° C. At the end of the addition, the temperature of the mixture was 86° C. The mixture was maintained at that temperature for 1 minute to develop a nucleating solution, and then 1419 gallons of the aforesaid titanium sulphate solution at 70° C. were added to the nucleating solution in the course of 6½ minutes. The final temperature of the mixture was 78° C. The mixture was then raised to the boil in the course of 30 minutes and boiled for 2 hours to complete the hydrolysis operation. The yield was 96.3 percent. The precipitate so obtained was washed, calcined at 850° C., and ground, and the resulting product was composed of particles ranging in size from 0.5 to 3.0 microns, and consisted predominantly of particles of 2.0 microns.

Suspension hydrolysates obtained as described under (a) were mixed together in proportions such that 12 percent of the titanium dioxide present in the mixture consisted of the titanium dioxide of suspension (b). The mixed precipitates were washed free from iron in the usual manner. By calcining the mixed precipitate at 860° C. free flowing non-dusting titanium dioixde was obtained that was suitable for incorporation in vitreous enamels. It had a dust content of 8.6 percent.

*Test for Dust Content*

The dust contents of the products referred to in the foregoing examples were determined by blowing a gas at a fixed rate for a given time through a known weight of the product in the fluidised state in a vertical tube in the following manner: The glass tube had a length of 21 inches and an internal diameter of 1 inch, and a disc of sintered glass having a pore size of 200–250 microns and a thickness of 5 mm. was held in position at the lower end of the tube by a rubber sleeve. The product to be tested was sieved through a sieve of 60 mesh B.S.S. and, when necessary, dried at about 110° C. for 1 hour. 20 grams of the sieved material were placed in the glass tube on the sintered glass disc. Oxygen from a cylinder was passed through a needle valve and a rotameter and through the glass disc into the material to be tested. The rate of flow of the oxygen was adjusted to 5.0 litres of oxygen per minute (measured at 20° C. and 760 mm.). The said rate of flow of oxygen was maintained for 5 minutes. The loss in weight of the material due to the dust caried away by the oxygen was determined by weighing the material left in the tube. If, during the test, the material showed signs of channelling to allow the gas to pass through without properly fluidising the material, the glass tube was lightly tapped.

I claim:

1. A process for the manufacture of titanium dioxide suitable for incorporation in vitreous enamels, wherein a hydrous precipitated titanium dioxide of coarse particle size such that, before and after calcination and dressing, it consists at least mainly of particles within the range of 5 to 20 microns is mixed with a hydrous precipitated titanium dioxide of fine particle size such that, before and after calcination and grinding, it consists of particles of a size not exceeding 3 microns, the proportion of the latter titanium dioxide amounting to 2.5 to 50 percent of the mixture calculated as $TiO_2$, and the mixture is subjected to calcination.

2. A process as claimed in claim 1, wherein there is used a hydrous precipitated titanium dioxide of fine particle size such that, before and after calcination and grinding, it consists of particles of a size not exceeding 1 micron.

3. A process as claimed in claim 1, wherein there are used hydrous precipitates prepared by the hydrolysis of aqueous solutions of titanium sulphate obtained by the sulphation of a material selected from the group consisting of ilmenites and titanium-enriched materials prepared from ilmenites.

4. A process as claimed in claim 3, wherein the hydrous titanium dioxide of coarse particle size is one that has been prepared by hydrolysing such an aqueous solution of titanium sulphate at a temperature of at least 80° C. under conditions such that at least the greater part of the hydrolysis takes place at a concentration of dissolved and undissolved titanium within the range of 40 to 125 grams per litre calculated as $TiO_2$ and at a factor of acidity not exceeding 100 percent, and the hydrous titanium dioxide of fine particle size is one that has been prepared by hydrolysing such an aqueous solution of titanium sulphate at a concentration of dissolved and undissolved titanium higher than 150 grams per litre calculated as $TiO_2$.

5. A process as claimed in claim 4, wherein the hydrolysis to produce the hydrous titanium dioxide of coarse particle size is carried out at a temperature ranging from 90° C. up to the boiling point of the solution.

6. A process as claimed in claim 5, wherein the said hydrolysis is carried out by adding a titanium sulphate solution having a concentration of titanium higher than 125 grams per litre calculated as $TiO_2$ in the course of 5 to 40 minutes to a proportion of hot water such that after complete mixing the concentration of dissolved and undissolved titanium is within the range of 40 to 125 grams per litre calculated as $TiO_2$, and then the hydrolysis is completed.

7. A process as claimed in claim 4, wherein the hydrolysis to produce the hydrous titanium dioxide of fine particle size is carried out in the presence of nuclei of hydrous titanium dioxide.

8. A process as claimed in claim 7, wherein the said hydrolysis is carried out at a concentration of dissolved and undissolved titanium within the range of 180 to 230 grams per litre calculated as $TiO_2$.

References Cited in the file of this patent

UNITED STATES PATENTS

| | | |
|---|---|---|
| 2,218,704 | Erskine | Oct. 22, 1940 |
| 2,406,465 | Keats | Aug. 27, 1946 |
| 2,439,895 | Keats et al. | Apr. 20, 1948 |
| 2,477,559 | Cauwenberg et al. | Aug. 2, 1949 |
| 2,527,257 | Judd | Oct. 24, 1950 |
| 2,589,964 | Richmond et al. | Mar. 18, 1952 |

FOREIGN PATENTS

| | | |
|---|---|---|
| 671,729 | Great Britain | May 7, 1952 |